United States Patent [19]

Sherman et al.

[11] 3,885,927

[45] May 27, 1975

[54] PROCESS FOR REMOVING CARBON DIOXIDE FROM GAS STREAMS

[75] Inventors: John Delano Sherman, Chappaqua; Ronald Jay Ross, Upper Nyack, both of N.Y.

[73] Assignee: Union Carbide Corporation, New York, N.Y.

[22] Filed: Feb. 5, 1974

[21] Appl. No.: 439,711

[52] U.S. Cl............................................ 55/68; 55/75
[51] Int. Cl................................................ B01d 53/02
[58] Field of Search....................................... 55/68, 75

[56] References Cited
UNITED STATES PATENTS

| | | | |
|---|---|---|---|
| 2,882,244 | 4/1959 | Milton | 55/75 X |
| 3,078,639 | 2/1963 | Milton | 55/68 |
| 3,808,773 | 5/1974 | Reyhing et al. | 55/68 X |

*Primary Examiner*—John Adee
*Attorney, Agent, or Firm*—Richard G. Miller

[57] ABSTRACT

A more efficient removal by selective adsorption of carbon dioxide from nitrogen-containing gas streams is achieved by using as the adsorbent a Type X zeolitic molecular sieve containing at least 90 equivalent per cent barium cations.

3 Claims, No Drawings

PROCESS FOR REMOVING CARBON DIOXIDE FROM GAS STREAMS

The present invention relates in general to the purification of gas streams by the removal of carbon dioxide as an impurity therefrom, and more particularly to a process for selectively adsorbing carbon dioxide from gas streams comprising nitrogen and carbon dioxide which utilizes as the adsorbent a barium cation form of zeolite X in which at least 90 percent of the framework $AlO_4$-tetrahedra of the zeolite lattice are associated with barium cations.

It is well known that carbon dioxide is readily adsorbed by the various cation forms of zeolite X. U.S. Pat. No. 2,882,244 in which zeolite X is described in detail and the method for its manufacture set forth, discloses that at 25°C and in a static system containing $CO_2$ at a pressure of 750 mm. Hg, 26.3 weight per cent $CO_2$ is adsorbed by the sodium cation form of zeolite X.

It is also known that both qualitative and quantitative changes in the cation population of the zeolite has a marked effect upon its adsorptive property with respect to a particular sorbate. The nature of the change is entirely unpredictable, however, as evidenced by the data in Table 1, below, taken from U.S. Pat. Nos. 2,882,244 and 3,078,639.

TABLE 1

| Adsorbate | T, °C | P, mm Hg | Wt. % Adsorbed by Na$_2$X | CaX | BaX | MgX |
|---|---|---|---|---|---|---|
| Argon | −196 | 146 | 42.0 | 43.7 | 34.1 | — |
| Nitrogen | −75 | 500 | 9.6 | 7.9 | 10.0 | — |
|  | −75 | 738 | — | 9.0 | 10.8 | — |
|  | −196 | 700 | 27.9 | 29.2 | 21.9 | — |
| Water | 25 | 4.5 | 29.3 | 33.3 | 25.8 | 34.2 |
|  |  | 24 | 35.5 | 39.5 | 27.7 | — |
| n-hexane | 25 | 20 | 19.2 | — | 15.8 | 18.3 |
| Methyl Cyclohexane | 25 | 38 | 20.7 | — | 16.8 | 21.4 |
| Carbon Monoxide | −75 | 500 | 15.8 | — | 10.0 | — |
|  | −75 | 25 | — | 5.4 | 8.1 | — |
|  | 0 | 25 | — | 2.5 | 0.8 | — |
|  | 0 | 750 | 5.1 | 5.1 | 6.8 | — |
| Oxygen | −183 | 700 | 35.6 | 37.6 | 27.7 | — |
| Krypton | −78 | 700 | 41.2 | 38.3 | 36.4 | — |
| Xenon | −78 | 700 | 72.6 | 71.0 | 59.0 | — |
| Cyclohexane | 25 | 45 | 19.6 | — | 16.8 | — |

It is apparent from the foregoing data that as a general rule, the barium-exchanged form of zeolite X has less capacity for a wide variety of sorbate molecules than does either the as-produced sodium zeolite X or the calcium- or magnesium-exchanged forms of zeolite X. The calcium- and magnesium-exchanged forms, moreover, exhibit a greater apparent capacity for certain substances than does the sodium form, and less capacity with respect to other substances.

Another factor to be considered in assessing the adsorbent properties of the various cation forms of zeolite X is that the adsorbent's performance under static conditions is not necessarily the same under dynamic conditions; i.e., where a gas stream containing the sorbate is fed into a fixed bed containing the adsorbent.

There are many commercial processes in which selective removal of carbon dioxide from gas streams under dynamic conditions is an important consideration. One such process of particular importance is the low temperature separation of air by liquefaction. The feed of these plants is ambient air supplied at a rate of 5000 to 5,000,000 SCFH, depending on the design capacity of the particular plant. It is particularly desirable to remove carbon dioxide and water from the feed gas before it enters the cold box in order to prevent freeze-ups in the heat exchangers and elsewhere in the system.

It has now been found that carbon dioxide can be very efficiently removed from gas streams containing same at a concentration of not more than about 1000 ppm by volume by passing the said gas stream through a bed of activated zeolite X molecular sieve having a $BaO/Al_2O_3$ molar ratio of at least 0.90 and, preferably, at least 0.95, at a temperature of from −40°F to +120°F, preferably less than +80°F, at a pressure of from about 6 to 170 atmospheres, and at a feed rate to the bed of from 5000 to 5,000,000 standard cubic feet per hour. A complete description of zeolite X and the method for its manufacture is set forth in detail in U.S. Pat. No. 2,882,244.

The gas streams to be suitably treated in accordance with the present process are air and mixtures comprising nitrogen and carbon dioxide, which may also contain additional oxygen and other gases inert toward the molecular sieve adsorbent and other components of the gas stream under the operating conditions employed. Argon, helium and neon can be present whether or not oxygen is also present but mixtures which contain hydrogen or hydrocarbons should not also contain oxygen to avoid the hazards of combustion in the adsorbent bed. The presence of water vapor in the feed stream, however, reduces the capacity of the activated barium-exchanged zeolite X for carbon dioxide. Accordingly, in a typical process a feed stream such as ambient air is first suitably dried by heat-exchange to remove water by condensation, followed by contact with a separate, activated molecular sieve drying bed.

The proportions of the various components of the gas mixture are not at all critical, but since the process is designed primarily as a purification procedure rather than a bulk separation procedure, the carbon dioxide content of the gas stream should usually not be greater than about 1000 ppm by volume. The removal of carbon dioxide (approximately 300 to 400 ppm inlet concentration) from atmospheric air is a particularly advantageous embodiment of the present process. Another embodiment is the removal of very small amounts of carbon dioxide from nitrogen, such as posttreatment of nitrogen-containing streams which have undergone bulk $CO_2$-removal; a typical example thereof is the removal of the small quantity of residual $CO_2$ in ammonia synthesis gas streams following treatment by water-scrubbing, hot carbonate scrubbing, or ethanolamine absorption.

Although barium-exchanged forms of zeolite X have been known for many years, the unique dynamic adsorption capacity of a highly exchanged material for carbon dioxide was apparently not recognized in the prior art. This unusual adsorption capacity is shown by the data set forth in Table 2 below. In determining the static adsorption capacities of the adsorbents tested, the conventional McBain-Bakr system was employed. For the dynamic adsorption capacity determinations as reported in Table 2, the following apparatus and procedure were utilized.

The apparatus for such determination has as its major components a Type 3A molecular sieve dryer, heat exchanger, adsorption column, temperature and pressure controllers, gas sampling system and $CO_2$ analyzers. Temperature and pressure are held at 75° F± 1°F and 75 psig, respectively. Flow rate of air supplied to the bed is 150 or 200 SCFH, depending on the size of the adsorbent agglomerates under test. The bed weight is 3 to 4 pounds. The $CO_2$ analyzers are calibrated with $CO_2/N_2$ gas mixtures of known compositions. Approximately 1600–1800 grams of the molecular sieve sample in tablet or pellet form are activated under vacuum for at least 16 hours at 350°C. The final activation pressure should be 200 microns Hg, preferably less than 50, or even 10 microns. The vacuum flasks are removed from the system and allowed to cool to room temperature. The vacuum is then broken with dry $N_2$. The sample is charged into the column while the column is being purged with $N_2$. The column is pressurized with $N_2$ and the bed is allowed to cool to ~76°F. At that time thermocouples for the influent and effluent gas should read the same temperature on the recorder (within ± 1°F.). The $N_2$ flowing through the column is shut off and the air is turned on, bypassing the column. The experimental flow rate is then set and the gas flow rate (2 SCFH) to the $CO_2$ analyzer is also adjusted. Once this is accomplished, the air is directed through the column and the experiment is begun. The run is terminated when the effluent $CO_2$ concentration equals the influent $CO_2$ concentration and has remained constant for one hour.

The barium-exchanged zeolite X employed in the experiments were prepared in the conventional manner using aqueous solutions of barium chloride at 95°C as the ion-exchange medium. For the higher degrees of exchange the sodium zeolite X was subjected to several treatments with fresh ion-exchange medium.

TABLE 2

| Sample No. | Adsorbent Composition | CO$_2$ Adsorption Conditions Static, Wt.-% Ads. 23°C., 25 Torr | 23°C., 760 Torr | Dynamic Wt-% Ads. |
|---|---|---|---|---|
| 1 | BaX: BaO/Al$_2$O$_3$ = 0.95 | 17.7 | 24.8 | — |
| 2 | Na$_2$X: Na$_2$O/Al$_2$O$_3$ = 1 | 12.5 | 26.3 | — |
| 3 | Sample No. 1 in tablet form | 16.9 | 23.8 | 6.0 |
| 4 | Na$_2$X: Na$_2$O/Al$_2$O$_3$ = 0.98; in tablet form | 14.5 | 26.7 | 3.8 |
| 5 | Na$_2$X: Na$_2$O/Al$_2$O$_3$ = 1; pellets with clay binder | 9.7 | 19.9 | 3.1 |
| 6 | BaX: BaO/Al$_2$O$_3$ = 0.83; pellets from Sample No. 5, barium-exchanged | 10.5 | 18.5 | 3.6 |

Referring to Table 2, it is seen that sodium zeolite X powder, exchanged with barium cation to a value of 0.95 molar BaO/Al$_2$O$_3$ (Sample No. 1) had an unexpectedly high $CO_2$ sorption capacity of 17.7 wt.-% measured under equilibrium conditions (25 Torr) in the McBain-Bakr apparatus. This is in marked contrast to the sorption capacity of a typical sodium X powder under the same adsorption conditions (Sample No. 2).

In the dynamic capacity determinations, Sample No. 3 (tableted form of Sample No. 1) exhibited a value of 6.0 wt.-% $CO_2$, which is over 50% higher than the value of 3.8 wt.-% $CO_2$ for Sample No. 4, also in tablet form. Comparing the dynamic adsorption data for Samples No. 5 and 6, both with clay binder, it is seen that barium exchange again gave improved performance; even higher capacity would have been achieved if the degree of exchange in Sample No. 6 had been increased beyond the value of 0.83 BaO/Al$_2$O$_3$.

EXAMPLE

The following illustrates using this novel adsorbent in a dual-bed cyclic prepurification system according to the method of the invention:

A plant for the separation of air by liquefaction requires 2,050,000 SCFH of atmospheric air feed at 40°F and 600 psia. This feed is water-saturated and its $CO_2$ content is 320 ppm (by volume). Two dual-bed molecular sieve adsorber units are employed in series arrangement, each in a separate vessel. The first unit is a drier operated in a cyclic manner, that is, while one bed is adsorbing water, the other is being regenerated in preparation for the adsorption step. The second unit, the purifier, is for removal of $CO_2$ and likewise is operated in a cyclic manner.

The drier unit treats this feed stream so that a dew point of −100°F is achieved. The dried stream is passed to the purifier unit operated at 40°F and 600 psia. Each adsorber bed of this purifier unit is charged with 10,800 pounds of 0.95 ($BaO/Al_2O_3$ molar ratio) Ba-exchanged zeolite X in the form of 1/16-inch pellets. The concentration of $CO_2$ in the purifier effluent stream being supplied to the air plant heat exchangers is maintained at less than one ppm (vol) during each 8-hour adsorption period.

The foregoing weight of adsorbent charged is to be compared with the conventional charge of 18,400 pounds of pellets of the sodium cation form of zeolite X in each bed of this unit.

What is claimed is:

1. Process for removing carbon dioxide from gas streams which comprises providing a gas stream comprising nitrogen and carbon dioxide, said gas stream containing not more than about 1000 ppm by volume of carbon dioxide, passing said gas stream through an adsorption zone at a temperature of from −40°F to +120°F at a pressure of from about 6 to 170 atmospheres and at a feed rate of from 5000 to 5,000,000 standard cubic feet per hour, said adsorption zone containing the barium cation form of zeolite X in which the $BaO/Al_2O_3$ molar ratio is at least 0.90, whereby the carbon dioxide is selectively adsorbed and the effluent from the adsorption zone is substantially free of carbon dioxide.

2. Process according to claim 1 wherein the gas stream being treated is air.

3. Process according to claim 2 wherein the barium cation form of zeolite X has a molar $BaO/Al_2O_3$ ratio of at least 0.95.

* * * * *